United States Patent
Harshe

(10) Patent No.: US 12,291,111 B2
(45) Date of Patent: May 6, 2025

(54) CONTROL SYSTEM FOR AN ELECTRIC VEHICLE

(71) Applicant: Cummins Inc., Columbus, IN (US)

(72) Inventor: Omkar A. Harshe, Columbus, IN (US)

(73) Assignee: Cummins Inc., Columbus, IN (US)

( * ) Notice: Subject to any disclaimer, the term of this patent is extended or adjusted under 35 U.S.C. 154(b) by 171 days.

(21) Appl. No.: 18/110,275

(22) Filed: Feb. 15, 2023

(65) Prior Publication Data
US 2023/0271509 A1   Aug. 31, 2023

Related U.S. Application Data

(60) Provisional application No. 63/313,868, filed on Feb. 25, 2022.

(51) Int. Cl.
*B60L 50/60*   (2019.01)
*B60L 58/12*   (2019.01)
*B60L 58/24*   (2019.01)

(52) U.S. Cl.
CPC ............... *B60L 50/60* (2019.02); *B60L 58/12* (2019.02); *B60L 58/24* (2019.02); *B60L 2210/10* (2013.01); *B60L 2210/40* (2013.01); *B60L 2240/423* (2013.01)

(58) Field of Classification Search
None
See application file for complete search history.

(56) References Cited

U.S. PATENT DOCUMENTS

| | | | |
|---|---|---|---|
| 2018/0126840 A1* | 5/2018 | Yim | B60W 10/08 |
| 2020/0412160 A1* | 12/2020 | Manzoor | B60L 50/60 |
| 2021/0107447 A1* | 4/2021 | Oh | B60W 20/11 |
| 2021/0155112 A1* | 5/2021 | Herring | B60K 35/21 |
| 2021/0323532 A1* | 10/2021 | Huh | B60K 6/387 |
| 2021/0354593 A1* | 11/2021 | Wang | B60L 58/27 |
| 2023/0166720 A1* | 6/2023 | Jones | B60K 6/26 701/22 |

FOREIGN PATENT DOCUMENTS

WO   WO-2020123921 A1 *   6/2020   ............... B60K 6/28

OTHER PUBLICATIONS

Electric Vehicle Motor Torque and Power Curves accessed through https://x-engineer.org/electric-vehicle-motor-torque-power-curves/ (Year: 2024).*

* cited by examiner

*Primary Examiner* — Wade Miles
*Assistant Examiner* — Arslan Azhar
(74) *Attorney, Agent, or Firm* — Faegre Drinker Biddle & Reath LLP

(57) ABSTRACT

A control system for controlling a powertrain of an electric vehicle is disclosed. The powertrain comprises a traction motor and a battery for powering the traction motor. The control system is configured to detect a low state of charge of the battery and to operate the powertrain in a low state of charge mode when the low state of charge is detected. In the low state of charge mode, the control system adjusts at least one parameter of the powertrain, such as traction motor torque, powertrain cooling, accessory cooling and accessory power consumption, to reduce power drawn from the battery.

20 Claims, 7 Drawing Sheets

CONTROL SYSTEM FOR AN ELECTRIC VEHICLE

CROSS-REFERENCE TO RELATED APPLICATIONS

The present application claims priority to U.S. Provisional Application Ser. No. 63/313,868, entitled "CONTROL SYSTEM FOR AN ELECTRIC VEHICLE," filed on Feb. 25, 2022, the entire disclosure of which being expressly incorporated herein by reference.

FIELD OF THE DISCLOSURE

The present disclosure relates to a control system for an electric vehicle, and in particular a control system for managing the vehicle's performance at low state of charge.

BACKGROUND

Electric vehicles, such as cars, buses, vans and trucks, use one or more traction motors for propulsion. The traction motor is powered by a battery, which comprises a large number of individual electrochemical cells connected in series and parallel to achieve the total voltage and current requirements. Typically, Lithium ion (Li-ion) battery cells are used as they provide a relatively good cycle life and energy density. The battery may include a battery management system (BMS) which is responsible for monitoring and management of the battery cells. During operation, the battery management system may estimate an inner state of the battery, such a state of charge (SOC). The SOC provides information about the amount of energy stored in the battery, and thus may be used as an indicator of available range.

During normal operation of an electric vehicle, as long as a reasonable range remains, the user's expectations are generally that vehicle performance is maintained. However, when the battery is at a low state of charge, improving the range may take precedence over vehicle performance. Typically, the traction motor is the most energy consuming component of the vehicle. However, in the case of a direct drive electric vehicle, where the speed of the traction motor has a direct correlation with the vehicle speed, it may be difficult to alter the overall powertrain efficiency without compromising vehicle performance.

It would therefore be desirable to provide techniques for extending the range of the vehicle at low state of charge.

SUMMARY

According to one aspect of the present disclosure there is provided a control system for controlling a powertrain of an electric vehicle, the powertrain comprising a traction motor and a battery for powering the traction motor, wherein the control system is configured to:
  detect a low state of charge of the battery; and
  operate the powertrain in a low state of charge mode when the low state of charge is detected,
  wherein, in the low state of charge mode, the control system adjusts at least one parameter of the powertrain to reduce power drawn from the battery.

The present disclosure may provide the advantage that, by operating the powertrain in the low state of charge mode, it may be possible to extend the range of the vehicle when the battery is at low state of charge.

The parameter which is adjusted may comprise at least one of traction motor torque, powertrain cooling (for example, traction motor cooling, inverter cooling and/or battery cooling), accessory cooling and accessory power consumption. For example, at least one of traction motor torque, traction motor cooling, inverter cooling, battery cooling, accessory cooling or accessory power consumption may be reduced in the low state of charge mode, in comparison to a normal operating mode.

The control system may be configured to operate the powertrain system in a normal operating mode when the low state of charge of the battery is not detected. In the normal operating mode, the control system may, for example, operate the traction motor according to a driver power demand, operate a traction motor cooling system to achieve a desired temperature range, operate a battery cooling system to achieve a desired temperature range and/or operate vehicle accessories according to at least one of driver, passenger or vehicle demand.

Traction motors for electric vehicles are typically most efficient at medium speed and torque values (in the center of the speed torque map). Motor efficiency is typically lower at higher torque and/or speed operation. Therefore, in one embodiment of the disclosure, the control system is configured to reduce traction motor torque (for example, at higher motor speed) in the low state of charge mode, in comparison to the torque in a normal operating mode. This may help to ensure that the traction motor operates in an efficient operating zone, reducing motor efficiency losses. This may help to reduce power consumption, and thus increase the range of the vehicle at low state of charge.

In one embodiment, the powertrain system comprises an inverter for supplying power to the traction motor, and the control system is configured to control the inverter to reduce a torque of the traction motor in the low state of charge mode.

In one embodiment, the control system is configured to produce a desired torque signal indicating a desired torque of the traction motor based on an accelerator pedal position signal (and the limits enforced based on traction motor and battery capability), and to reduce the torque of the traction motor in comparison to the desired torque in the low state of charge mode.

Although reducing traction motor torque may help to improve the vehicle's range at low state of charge, it may be desirable not to reduce torque at low speed, as this may affect vehicle gradeability. Therefore, in one embodiment, the control system is configured to determine when a speed of the traction motor exceeds a threshold, and to reduce a torque of the traction motor when the speed exceeds the threshold in the low state of charge mode. For example, in one embodiment, the amount by which the torque of the traction motor is reduced is increased progressively with increase in speed of the traction motor. Alternatively, a fixed limit could be placed on the torque when the speed exceeds the threshold, or some other manner of reducing the torque could be used.

When the battery is at low state of charge, the remaining range of the vehicle may be limited. Since high voltage batteries generally have a high thermal inertia, it may be possible to reduce the amount of battery cooling and/or heating towards the end of a mission. It may also be possible to run the battery and/or traction motor at a higher temperature than would otherwise be the case. Furthermore, If the traction motor torque is reduced in comparison to normal operation, then the cooling requirements of the traction motor and/or battery may be reduced.

In one embodiment, the powertrain comprises a traction motor cooling system, and the control system is arranged to reduce an amount of cooling provided by the traction motor cooling system in the low state of charge mode (in comparison to a normal operating mode). The traction motor cooling system may be arranged to cool the traction motor and/or an inverter. The traction motor cooling system may comprise at least one of a pump and a fan, and the control system may be configured to reduce the speed of at least one of the pump and the fan in the low state of charge mode.

In one embodiment, the powertrain comprises a battery cooling system, and the control system is arranged to reduce an amount of cooling provided by the battery cooling system in the low state of charge mode (in comparison to a normal operating mode). The battery cooling system may comprise at least one of a chiller, heater, a pump and a fan, and the control system may be configured to reduce the speed of at least one of the pump and the fan and/or reduce or turn off the chilling of the chiller in the low state of charge mode.

In one embodiment, the powertrain comprises a battery heating system, and the control system is arranged to reduce an amount of heating provided by the battery heating system in the low state of charge mode (in comparison to a normal operating mode).

If the traction motor torque is reduced in comparison to normal operation, then the heat generated in the traction motor is likely to be lower than would otherwise be the case. Furthermore, the current drawn from the battery is likely to be lower, and thus heat generated in the battery is likely to be lower. As a consequence, the cooling requirements of the traction motor and/or battery may be reduced.

Therefore, in one embodiment of the disclosure, the control system is configured to reduce traction motor torque and at least one of traction motor cooling and battery cooling in the low state of charge mode, in comparison to a normal operating mode. Thus, in this embodiment, a number of complementary measures may be taken which, in combination, may allow a greater reduction in energy consumption than if each were applied in isolation. This may therefore provide the advantage of a greater reduction in energy consumption and thus improved range at low state of charge.

In one embodiment, the powertrain comprises at least one electrical accessory and the control system is configured to reduce a power consumption of at least one electrical accessory in the low state of charge mode (in comparison to a normal operating mode). For example, the control system may be configured to reduce the power consumption of or disable an accessory which is not mission critical in the low state of charge mode. Thus, non-essential accessory loads (such as cell phone charging points, air conditioners etc) may be disabled or limited in performance in the low state of charge mode.

In one embodiment, the powertrain comprises at least one of a DC-to-DC converter and a DC-to-AC converter, and the control system is configured to reduce a power drawn from at least one of the DC-to-DC converter and DC-to-AC converter in the low state of charge mode.

In one embodiment, the powertrain comprises a DC-to-DC converter and a low voltage battery and the control system is configured to stop charging the low voltage battery using the high voltage battery and the DC-to-DC converter in the low state of charge mode.

In one embodiment the powertrain comprises an accessory cooling system, and the control system is arranged to reduce an amount of cooling provided by the accessory cooling system in the low state of charge mode.

The above arrangements may help to reduce the power consumed and thus increase range in the low state of charge mode.

In one embodiment, the battery comprises a battery management system configured to monitor a state of charge of the battery, and the control system is configured to receive a state of charge signal from the battery management system and to determine whether the state of charge signal is below a threshold. This may allow the control system to detect the low state of charge.

As the state of charge of the battery decreases towards zero, increasing the vehicle range may take greater priority. Therefore, in one embodiment, the control system is configured such that the amount by which the parameter is adjusted is varied in dependence on a value of the state of charge signal. For example, the control system may be configured to reduce at least one of traction motor torque, traction motor cooling, battery cooling and accessories power consumption by an increasing amount as the state of charge signal decreases below a threshold. This may help to slow down the reduction in range as the state of charge decreases.

According to another aspect of the disclosure there is provided a powertrain for an electric vehicle, the powertrain comprising a traction motor, a battery configured to power the traction motor, and a control system, wherein the control system is configured to:
  detect a low state of charge of the battery; and
  operate the powertrain in a low state of charge mode when the low state of charge is detected,
  wherein, in the low state of charge mode, the control system adjusts at least one parameter of the powertrain to reduce power drawn from the battery.

According to a further aspect of the disclosure there is provided a method of operating a powertrain for an electric vehicle, the powertrain comprising a traction motor and a battery for powering the traction motor, the method comprising:
  detecting a low state of charge of the battery; and
  operating the powertrain in a low state of charge mode when the low state of charge is detected,
  wherein, in the low state of charge mode, at least one parameter of the powertrain is adjusted to reduce power drawn from the battery.

Features of one aspect of the disclosure may be used with any other aspect. Any of the apparatus features may be provided as method features and vice versa.

BRIEF DESCRIPTION OF THE DRAWINGS

Exemplary features of the present disclosure will now be described, purely by way of example, with reference to the accompanying drawings, in which.

DETAILED DESCRIPTION OF EMBODIMENTS OF THE DISCLOSURE

Figure 1:
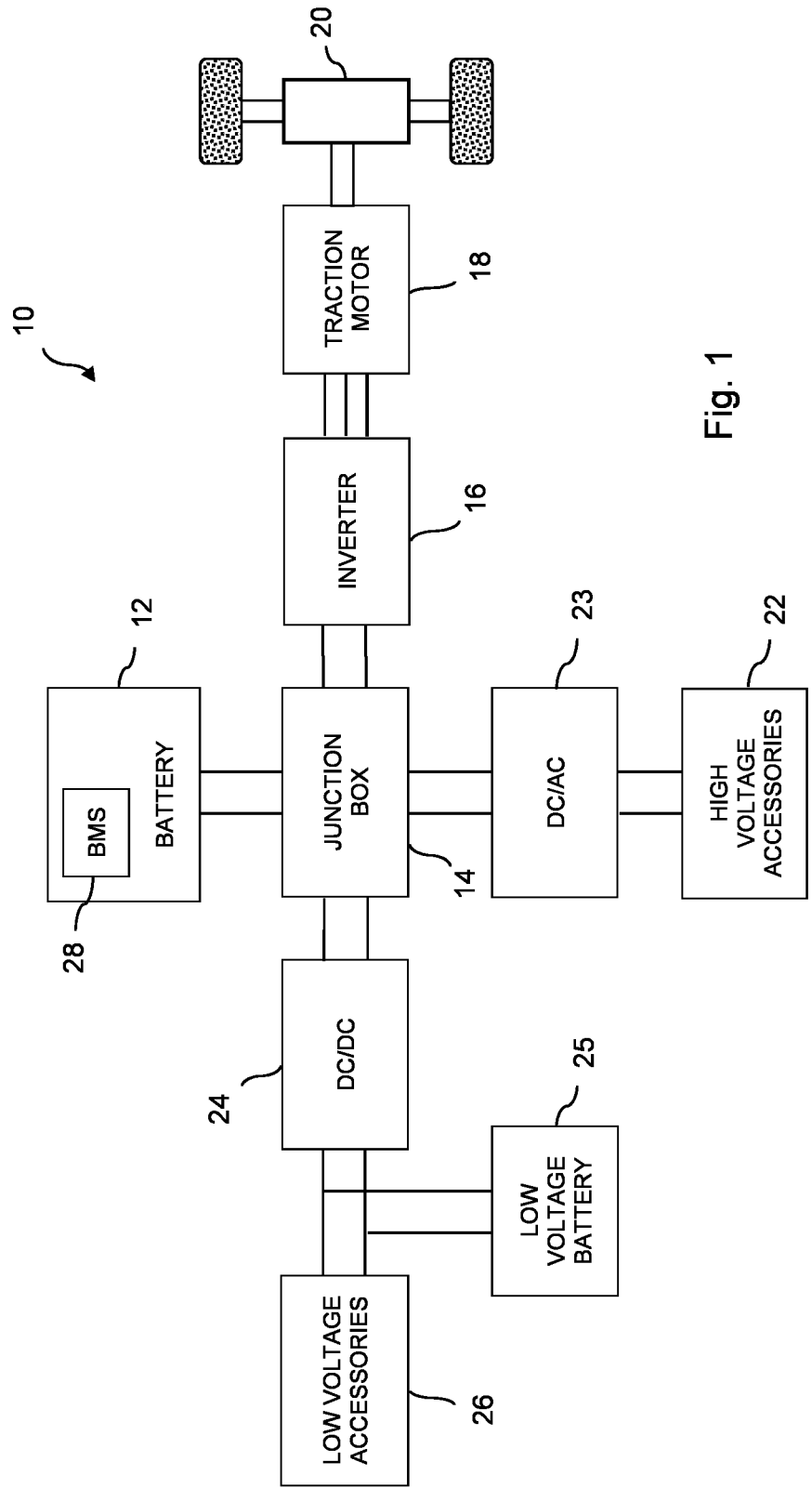
FIG. 1 shows parts of an exemplary powertrain system for an electric vehicle.

FIG. 1 shows parts of an exemplary powertrain system for an electric vehicle. Referring to FIG. 1, the powertrain system 10 comprises battery 12, junction box 14, traction motor inverter 16, traction motor 18, vehicle drivetrain 20, high voltage electrical accessories 22, DC-to-AC converter 23, DC-to-DC converter 24, and low voltage electrical accessories 26. The battery 12 is electrically connected to the junction box 14. The junction box 14 is also electrically connected to the inverter 16, high voltage electrical accessories 22 and DC to DC converter 24. The junction box 14 is configured to provide a DC bus between the battery 12, the inverter 16, the DC-to-AC converter 23 and the DC-to-DC converter 24. The inverter 16 is configured to convert a DC voltage on the DC bus to AC to drive the traction motor 18. The traction motor 18 is mechanically connected to the vehicle drivetrain 20. The traction motor 18 may be, for example, a permanent magnet motor, although other types of motor could be used instead. The traction motor 18 may also operate as a generator and may use regenerative braking to convert mechanical power from the drivetrain 20 to electrical power to provide power to the components on DC bus, such as the battery 12. In this case, the inverter 16 may be used to convert an AC output of the traction motor 18 (when operating as a generator) to DC for supply to the battery 12 via the junction box 14. The vehicle drivetrain 20 typically comprises a drive shaft and a differential connected to driven wheels, in a manner known in the art. The high voltage electrical accessories 22 may comprise components such as a heater, power steering inverter, compressor, fan, etc. The DC-to-DC converter 24 converts the relatively high voltage (for example, between 200V and 800V) at the junction box 14 to a lower voltage (for example, 12V or 24V) for use in powering the low voltage vehicle accessories 26. A low voltage battery 25 may also be connected to the DC-to-DC converter 24. The DC-to-DC converter may be bidirectional, and may be configured to convert a lower voltage from the low voltage battery 25 to a higher voltage for supply to the DC bus and vice versa. The DC-to-AC converter 23 is configured to convert the DC voltage on the DC bus to AC for supply to accessories which require an AC supply.

In operation, the traction motor 18 is used to supply mechanical power to the vehicle drivetrain 20. Electrical power for the traction motor 20 is supplied from the battery 12 via the junction box 14 and the inverter 16. The traction motor 18 may also operate in regenerative braking mode in which the vehicle's momentum is used to recover electrical energy to provide energy to components on DC bus. The battery 12 is charged from an external power source such as a charging station or the electrical grid. The battery 12 includes a battery management system 28 which is used to monitor and manage charge and discharge of the battery. The battery management system 28 may estimate an inner state of the battery, such a state of charge (SOC). The SOC is normally expressed as a percentage of the battery's nominal capacity. The battery 12 may be in the form of one or more battery packs, such as those disclosed in United Kingdom patent publications GB 2593187 A and GB 2594916 A, the subject matter of each of which is incorporated herein by reference, although other types of battery could be used instead.

When the battery is at low state of charge, the user's expectation from the powertrain changes from performance to being able to reach the nearest charging station. Thus, at a low stage of charge, improving range takes precedence over vehicle performance. Typically, the traction motor is the most energy consuming component. However, in direct drive electric vehicles such as that shown in FIG. 1, the speed of the traction motor has a direct correlation with the vehicle speed, and it may therefore be difficult to alter the overall powertrain efficiency without compromising vehicle performance.

In embodiments of the disclosure, various different strategies are applied in order to reduce the net energy spent on the vehicle while the battery state of charge is low.

Figure 2:
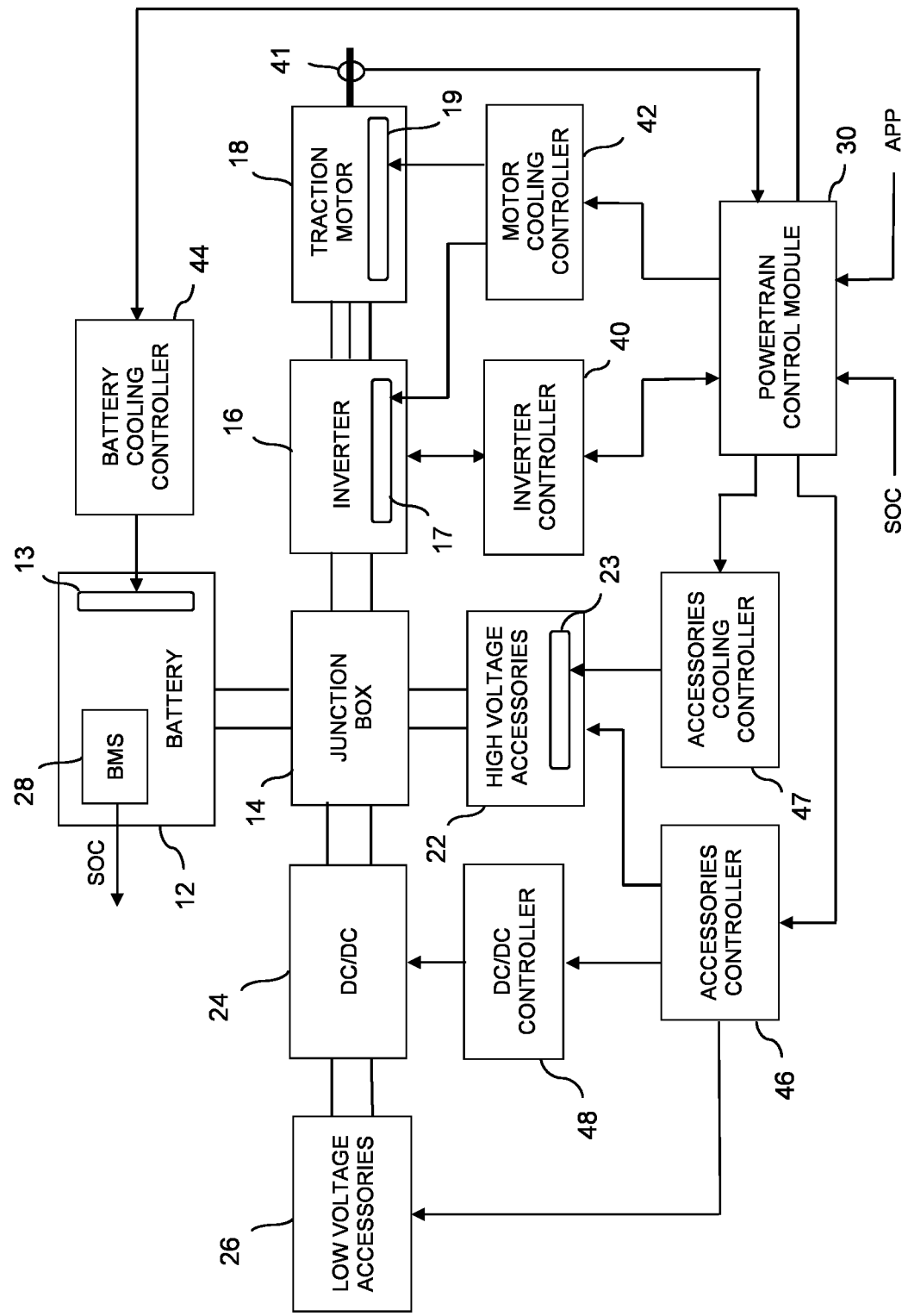
FIG. 2 shows parts of an electric vehicle powertrain system in an embodiment of the disclosure.

FIG. 2 shows parts of an electric vehicle powertrain system in an embodiment of the disclosure. Referring to FIG. 2, the system comprises battery 12, junction box 14, traction motor inverter 16, traction motor 18, high voltage electrical accessories 22, DC-to-DC converter 24, low voltage electrical accessories 26, powertrain control module 30, inverter controller 40, traction motor cooling controller 42, battery cooling controller 44, accessories controller 46 and accessories cooling controller 47. The battery 12, junction box 14, inverter 16, traction motor 18, high voltage electrical accessories 22, DC-to-DC converter 24 and low voltage electrical accessories 26 may be similar to or the same as those discussed above with reference to FIG. 1. The battery 12 includes a battery cooling system 13 for cooling the battery. The battery cooling system may comprise, for example, a pump for pumping coolant through cooling plates in the battery and/or one or more fans. The inverter 16 includes an inverter cooling system 17 for cooling the inverter. The inverter cooling system may comprise, for example, a pump for pumping coolant through the inverter and or one or more fans. The traction motor 18 includes a traction motor cooling system 19 for cooling the traction motor. The traction motor cooling system may comprise, for example, a pump for pumping coolant through a cooling jacket around the motor and/or and or one or more fans. Similarly, the high voltage accessories 22 include an accessories cooling system 23 for circulating coolant through the accessories. Each of the battery 12, inverter 16, traction motor 18 and high voltage accessories 22 may have separate cooling circuits with their own pump and fan, or one or more of the cooling circuits may be combined. Although not shown in FIG. 2, the battery 12 may also include a battery heating system and a battery heating controller, and/or a chiller, in a manner known in the art.

In the arrangement of FIG. 2, the powertrain control module 30 is used for overall control of the powertrain system. The inverter controller 40 is used to control the inverter 16, and thus the traction motor 18. The inverter controller 40 comprises sensors such as voltage and/or current sensors which provide sensed values of voltage and/or current for use in the control process. In addition, a speed sensor 41 senses the speed of the traction motor and provides the sensed speed to the powertrain control module 30. The traction motor cooling controller 42 is used to control the inverter cooling system 17 and the traction motor cooling system 19. For example, the traction motor cooling controller 42 may control the speed of a pump for pumping coolant through the inverter 16 and traction motor 18 and/or a fan for drawing air over the inverter or traction motor and/or a heat exchanger such as a radiator. The battery cooling controller 44 is used to control the battery's cooling system 13. For example, the battery cooling controller 44 may control the speed of a pump for pumping coolant through the battery and/or a fan for drawing air over the battery and/or a heat exchanger. The accessories controller 46 is used control the power drawn by the vehicle accessories and the DC-to-DC converter 24. The accessories cooling controller 47 is used to control the accessories' cooling system 23. For example, the accessories cooling controller 47 may control the speed of a pump for pumping coolant through the accessories and/or a fan for drawing air over the accessories and/or a heat exchanger. Each of the powertrain control module 30, inverter controller 40, traction motor cooling controller 42, battery cooling controller 44, accessories controller 46 and accessories cooling controller 47 may be implemented as software running on one or more processors and/or as firmware or hardware. The controllers may be separate controllers and may communicate via a network such as a CAN (Controller Area Network), or at least some of the controllers may be combined.

Figure 3:
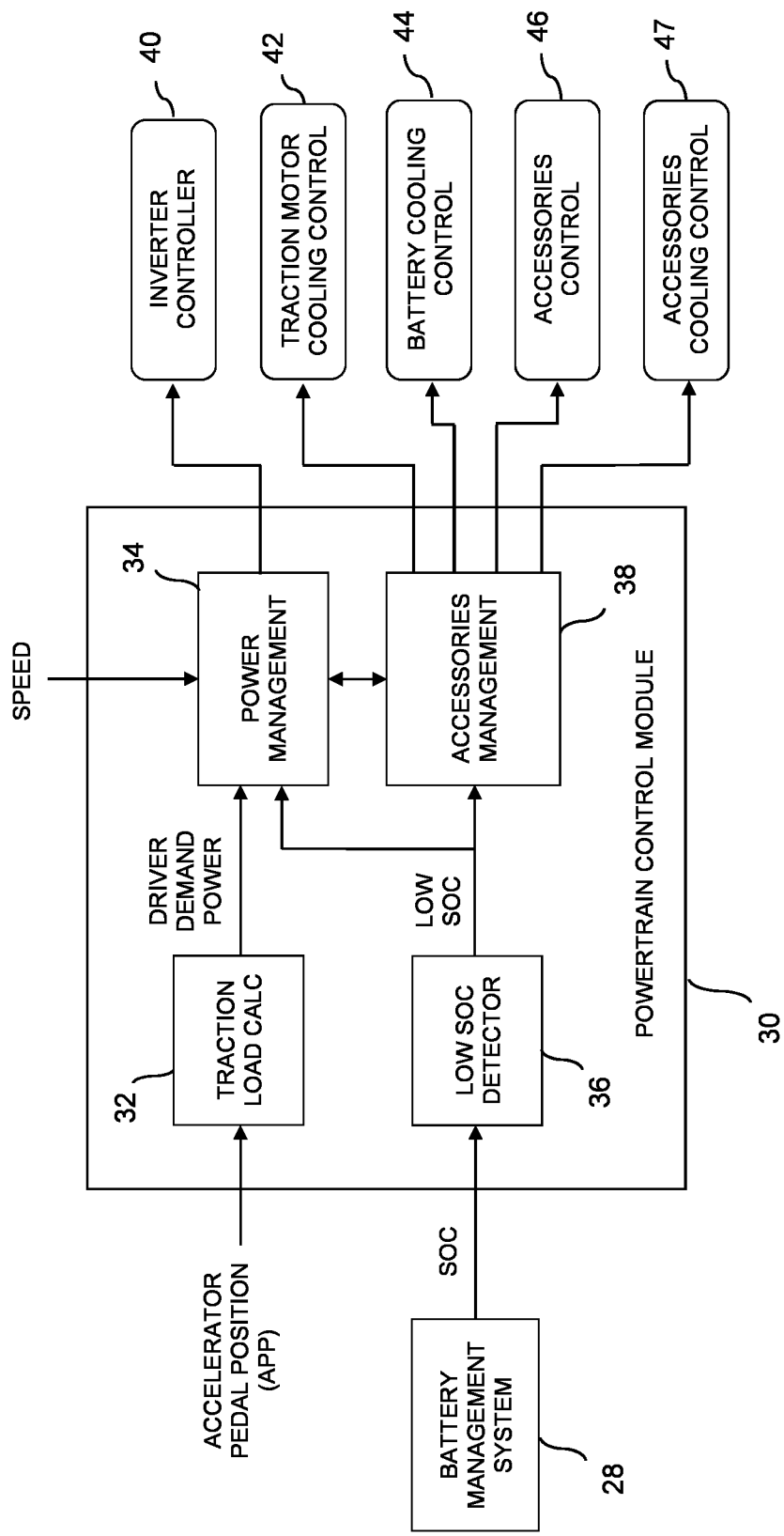
FIG. 3 shows parts of the control system of FIG. 2 in more detail.

FIG. 3 shows parts of the control system of FIG. 2 in more detail. Referring to FIG. 3, the control system comprises a powertrain control module 30 which is used to perform overall system control. The powertrain control module 30 includes a traction load calculation unit 32, a power management unit 34, a low state of charge (SOC) detection unit 36 and an accessories management unit 38. The powertrain control module 30 provides control signals for the traction motor inverter controller 40, traction motor cooling controller 42, battery cooling controller 44, accessories controller 46 and accessories cooling controller 47.

In operation, the powertrain control module 30 receives an accelerator pedal position (APP) signal from the vehicle's accelerator pedal. The APP signal is fed to the traction load calculation unit 32, which calculates a driver power demand signal based on the accelerator pedal position signal (and other signals not shown in FIG. 3). The driver power demand signal is a signal representative of the power which the driver of the vehicle desires from the traction motor. The driver power demand signal is fed to the power management unit 34.

The powertrain control module 30 also receives a state of charge (SOC) signal from the battery management system 28. Techniques for estimating the SOC include, for example, those disclosed in US 2021/0190867, the subject matter of which is incorporated herein by reference, although other techniques may be used instead. The SOC signal is fed to the low SOC detection unit 36. The low SOC detection unit 36 monitors the SOC signal, and detects when the vehicle's battery is at a low SOC. When a low SOC is detected, the low SOC detection unit 36 outputs a low SOC signal to the power management unit 34 and the accessories management unit 38.

In addition, the powertrain control module 30 receives a speed signal indicating the traction motor speed from the speed sensor 41. The speed signal is fed to the power management unit 34.

The power management unit 34 calculates control signals for the traction motor inverter controller 40 based on the driver power demand signal, the low SOC signal and the speed signal. The aim of the control is to meet the driver demand power within system capability. The output of the power management unit 34 is a torque control signal which is fed to the inverter controller 40 to control the torque of the traction motor.

The accessories management unit 38 generates control signals for controlling vehicle accessories such as heaters, fans and pumps. The accessories management unit 38 outputs control signals to the traction motor cooling controller 42, battery cooling controller 44, accessories controller 46 and accessories cooling controller 47. The traction motor cooling controller 42 is used to control cooling of the inverter and traction motor and/or other vehicle components. The battery cooling controller 44 is used to control cooling of the battery. The accessories controller 46 is used to control the power consumption of the vehicle's accessories. The accessories cooling controller 47 is used to control cooling of the accessories. The power management unit 34 and the accessories management unit 38 may also communicate with each other.

During normal operation, when the battery is not at a low state of charge, the control system allows the vehicle's powertrain to function as normal. In this case, a torque command signal based on the driver demand power is fed to the traction motor inverter controller 40, the traction motor cooling system is controlled to achieve a normal operating temperature, the battery cooling system is controlled to achieve a normal operating temperature, and all accessories are operated as normal. However, when the power management unit 34 and the accessories management unit 38 receive a low SOC signal from the low SOC detection unit 36, they switch from the normal operating mode to a low SOC mode. In the low SOC mode, the power management unit 34 and the accessories management unit 38 modify their control strategies in order to reduce the net energy consumed by the vehicle.

In embodiments of the disclosure, in the low SOC mode, one or more of the following control strategies is adopted:

1. Modifying traction motor operating map: The traction motor is typically most efficient at medium speed and torque values (in the heart of the speed torque map). Motor efficiency is lower at higher torque operation. Although limiting traction motor torque at low speed is not desirable as it impacts vehicle gradeability, limiting traction motor torque at higher speeds will ensure that the motor operates in its efficient operating zone reducing the motor efficiency losses.

2. Modifying traction motor and accessories cooling: In general, the operating temperature of a motor affects the motor's performance. However, it has been found that the efficiency of the traction motor is not severely affected when it runs slightly hotter than its normal operating temperature. At low state of charge, with the motor speed/torque limited as described above, heat generated in the traction motor is limited as well. Hence, running cooling fans and pumps slower will help to reduce the energy spent in running accessories leaving more energy available for the mission. Similar principles apply to accessories cooling.

3. Modifying battery cooling: High voltage batteries generally have a high thermal inertia. With a reduction in power demand from the powertrain, with the motor speed limited as described above, the current draw from the battery is lower, resulting in lower resistive losses. Reducing cooling/heating accessory loads may result in the battery taking a longer time to reach its thermal equilibrium; however, with the vehicle running at lower state of charge, the mission duration will not be long, and the vehicle can still continue with limited battery performance.

4. Modifying accessories control strategy: When the battery is at low SOC, operation of the DC-to-DC controller (and DC-to-AC controller if present) is modified to ensure that the energy drawn from the high voltage battery is being used to run mission critical accessories only. This should mean that all the non-essential accessory loads (cell phone charging points, air conditioners etc) are disabled or limited in performance. In addition, the DC-to-DC converter does not charge the low voltage battery when the traction battery is at low SOC.

Thus, it will be appreciated that, in the low SOC mode, a number of measures are applied in a synergistic manner to reduce the net energy consumed by the vehicle.

Figure 4:
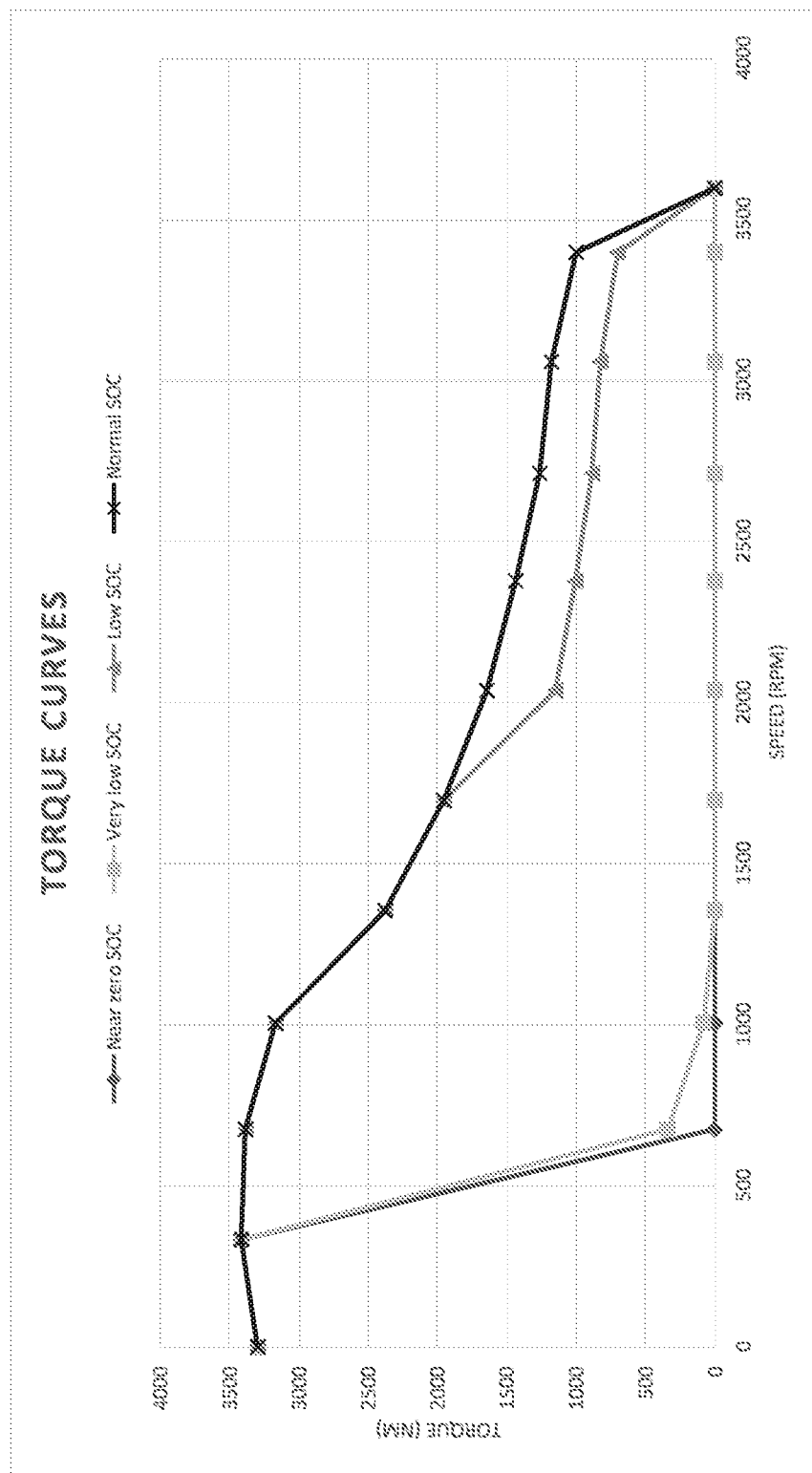
FIG. 4 illustrates how a traction motor operating map may be modified in an embodiment of the disclosure.

FIG. 4 illustrates how the traction motor operating map may be modified in an embodiment of the disclosure. In FIG. 4, reference torque speed curves are shown for various different values of battery SOC. Referring to FIG. 4, the top line (with crosses) shows the torque speed curve when the battery SOC is above a low SOC threshold. In one embodiment, the low SOC threshold may be 10% of notional battery capacity, although other values could be used instead. In this case, the torque speed curve is that which is used in normal operation. The torque is at or near a maximum at speeds of between approximately 0 and 1000 RPM. The torque decreases at higher speeds, until it reaches zero at speeds of around 3600 RPM.

The second line (with triangles) shows the torque speed curve when the battery SOC is below the low SOC threshold. In this case, the torque is reduced at speeds above approximately 1700 RPM, in comparison to normal operation. In this example, the amount of reduction in torque is approximately 30% at speeds of between about 2000 RPM and 3300 RPM. By reducing the traction motor torque at higher speeds, the motor operates in a more efficient operating zone. This reduces the motor efficiency losses, causing less current to be drawn from the battery and thereby extending the vehicle range.

The third line (with squares) shows the torque speed curve when the battery SOC is below a very low SOC threshold. In one embodiment, the very low SOC threshold may be 3% of notional battery capacity, although other values could be used instead. In this case, the torque is reduced rapidly at speeds above approximately 350 RPM, in comparison to normal operation. This further reduces the motor efficiency losses, at the expense of a loss in vehicle performance. However, a low level of torque is maintained at speeds of up to approximately 1300 RPM, in order to maintain vehicle gradeability.

The fourth line (with diamonds) shows the torque speed curve when the battery SOC is below a nearly zero SOC threshold. In one embodiment, the nearly zero SOC threshold may be 1% of notional battery capacity, although other values could be used instead. In this case, the torque is reduced rapidly at speeds above approximately 350 RPM, in comparison to normal operation, and reaches zero at speeds of around 650 RPM. This further reduces the motor efficiency losses, at the expense of a further loss in vehicle performance. However, this may provide the vehicle with a "limp home" capability when the SOC is near zero.

It will be appreciated that the curves shown in FIG. 4 and the various SOC thresholds mentioned above are given by way of example only in order to illustrate some of the principles of the disclosure, and the various curves and thresholds could be varied as appropriate to suit the circumstances.

Figure 5:
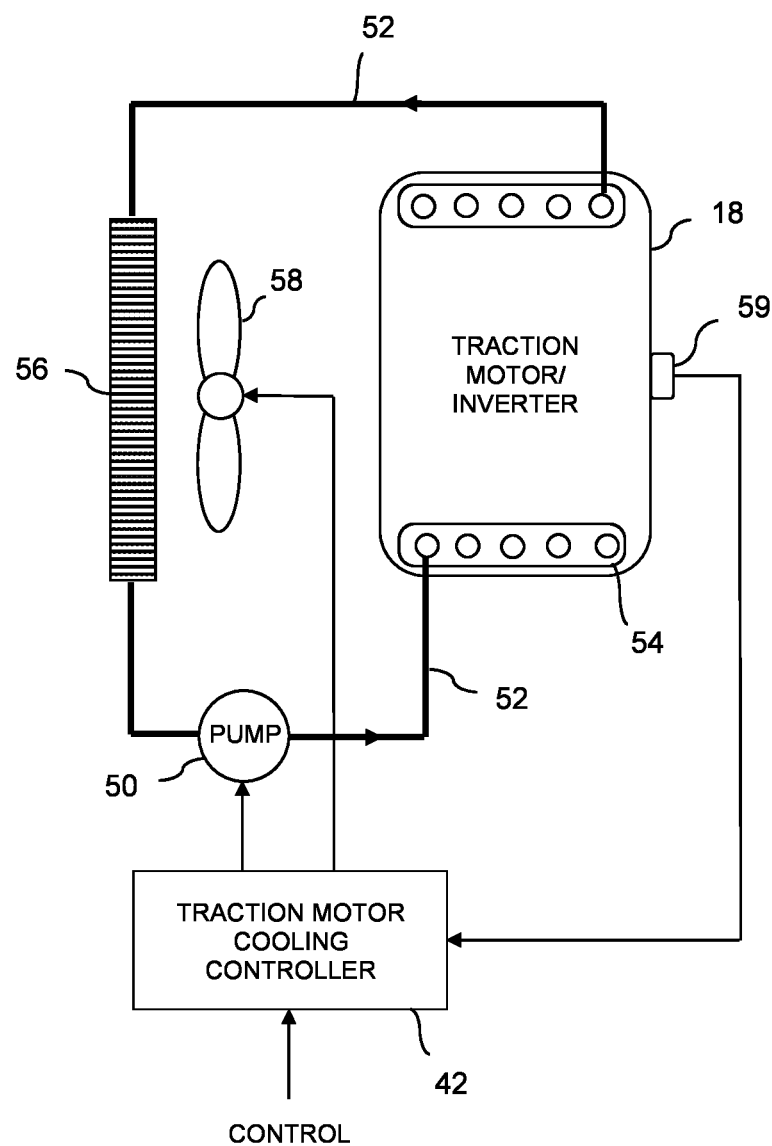
FIG. 5 shows parts of a traction motor cooling system in an embodiment of the disclosure.

FIG. 5 shows parts of a traction motor cooling system in an embodiment of the disclosure. Referring to FIG. 5, the traction motor cooling system comprises pump 50, tubing 52, traction motor cooling jacket 54, radiator 56, fan 58, temperature sensor 59 and traction motor cooling controller 42.

In operation, the pump 50 is used to pump coolant through the tubing 52 to the cooling jacket 54. In this embodiment, the coolant may be any suitable liquid coolant, such as oil or a water/glycol mix. The cooling jacket 54 comprises a plurality of cooling channels around the outside of the traction motor 18. The coolant flows through the cooling channels in order to conduct heat away from the motor. Coolant also flows through cooling channels in the inverter 16. Coolant exiting the traction motor/inverter flows through tubing to the radiator 56. The fan 58 blows cooling air through the radiator to reduce the temperature of the coolant before it returns to the pump 50. The traction motor cooling controller 42 is used to control the speed of the pump 50 and the fan 58. The temperature sensor 59 senses the temperature of the traction motor and inverter, and feeds the sensed temperature to the traction motor cooling controller 42. The traction motor cooling controller 42 receives the sensed temperature from the temperature sensor and adjusts the speed of the pump 50 and the fan 58 to achieve the desired temperature.

In the arrangement of FIG. 5, the traction motor cooling controller 42 receives a control signal from the powertrain control module 30 of FIGS. 2 and 3. In low SOC mode (when the SOC is below the low SOC threshold), the control signal instructs the traction motor cooling controller 42 to run the pump 50 and the fan 58 at a lower speed than during normal operation. For example, in one embodiment, the pump may be run at between 20% and 80% of its normal speed and the fan may be run at between 0% and 50% of its normal speed, although other values could be used instead. This reduces the power consumption of the cooling system, leaving more battery energy available for the mission. If desired, different pump and/or fan speeds could be set at different levels of battery SOC. For example, the pump and/or fan speed could be reduced by a larger amount when the SOC is below the very low SOC threshold and an even larger amount when the SOC is below the nearly zero SOC threshold.

With the traction motor torque reduced in the manner described above, less heat will be generated in the traction motor and inverter, and thus the amount of cooling which is required will be reduced. Furthermore, at low SOC, the remaining range of the vehicle is limited, and it may be possible to temporarily run the traction motor and inverter at a higher temperature than would otherwise be the case. However, a maximum temperature may be set as a safety limit, and the amount of cooling increased if necessary to prevent the temperature exceeding the safety limit.

It will be appreciated that the motor cooling system shown in FIG. 5 is given by way of example only, and other types of cooling system could be used instead or as well. For example, the cooling system could be based on one or more of air cooling, liquid cooling, direct refrigerant cooling, phase change material cooling, thermoelectric cooling, heat pipe cooling or any other type of cooling system. Furthermore, any appropriate parameter or parameters of the cooling system may be adjusted in order to reduce power consumption during low SOC. For example, a separate cooling circuit could be provided for circulating a coolant such as oil inside the traction motor, in which case the flow of coolant through the separate coolant circuit could be controlled. In one exemplary embodiment, the cooling system may be as disclosed in co-pending UK patent application number 2103793.2, the subject matter of which is incorporated herein by reference, although other types of cooling system could be used instead or as well.

Figure 6:
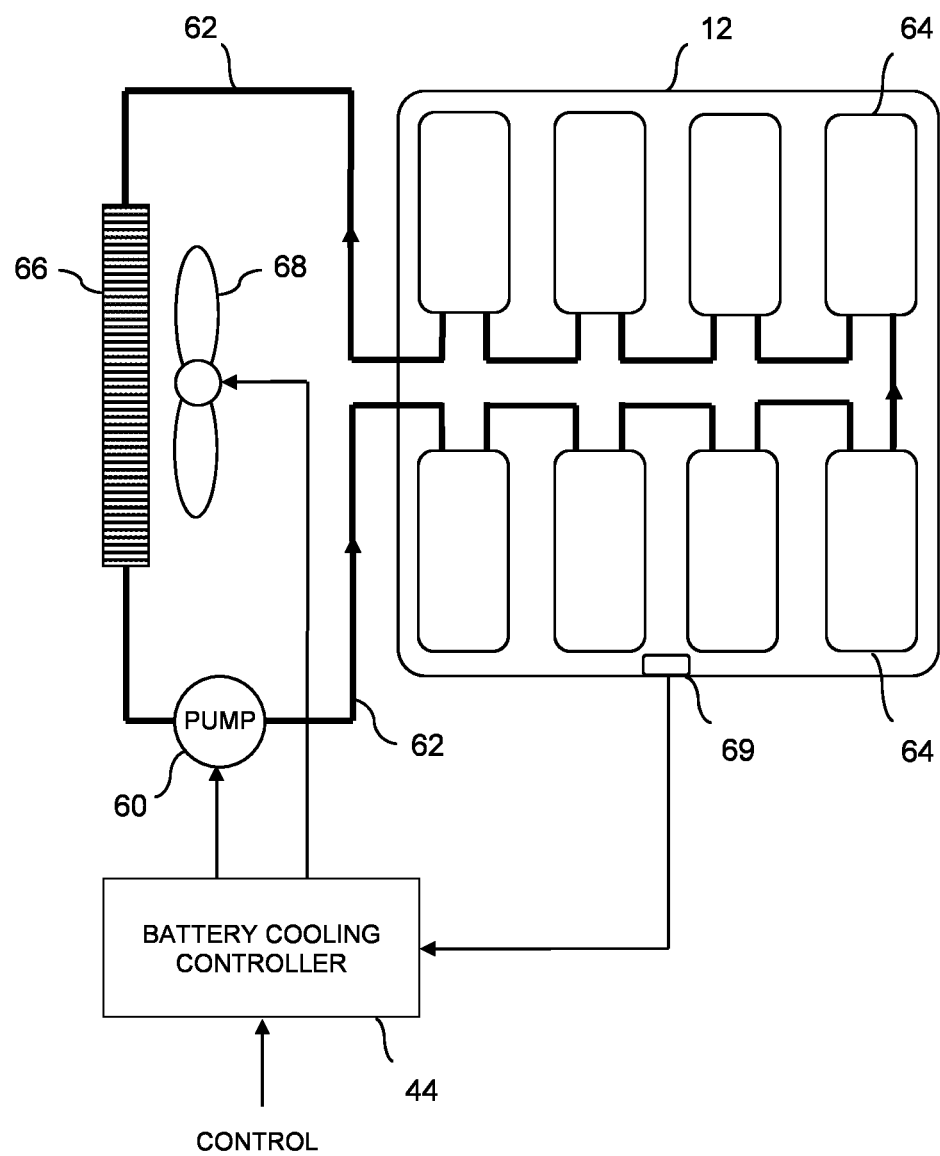
FIG. 6 shows parts of a battery cooling system in an embodiment of the disclosure.

FIG. 6 shows parts of a battery cooling system in an embodiment of the disclosure. Referring to FIG. 6, the battery cooling system comprises pump 60, tubing 62, battery cooling plates 64, radiator 66, fan 68, temperature sensor 69 and battery cooling controller 44. In operation, the pump 60 is used to pump coolant through the tubing 62 to the cooling plates 64. The coolant may be any suitable liquid coolant, such as oil or a water/glycol mix. The cooling plates are inside the battery 12 in thermal contact with the battery cells. The cooling plates may be, for example, in the form disclosed in GB 2593187 A and GB 2594916 A. The coolant flows through the cooling plates in order to conduct heat away from the battery cells. Coolant exiting the battery flows to the radiator 66. The fan 68 blows cooling air through the radiator to reduce the temperature of the coolant before it returns to the pump 60. The speed of the pump 60 and the fan 68 are controlled by the traction motor cooling controller 44. The temperature sensor 69 senses the temperature of the battery and feeds the sensed temperature to the battery cooling controller 44. The battery cooling controller 44 receives the sensed temperature and adjusts the speed of the pump 60 and the fan 68 to achieve the desired temperature.

In the arrangement of FIG. 6, the battery cooling controller 44 receives a control signal from the powertrain control module 30 of FIGS. 2 and 3. In low SOC mode, the control signal instructs the battery cooling controller 44 to run the pump 60 and the fan 68 at a lower speed than during normal operation. For example, in one embodiment, the pump may be run at between 20% and 80% of its normal speed and the fan may be run at between 0% and 50% of its normal speed, although other values could be used instead. This reduces the power consumption of the cooling system, leaving more battery energy available for the mission. If desired, different pump and/or fan speeds could be set at different levels of battery SOC. For example, the pump and/or fan speed could be reduced by a larger amount when the SOC is below the very low SOC threshold and an even larger amount when the SOC is below the nearly zero SOC threshold.

With the traction motor torque reduced in the manner described above, less current will be drawn from the battery, and thus the amount of battery cooling which is required will be reduced. Furthermore, at low SOC, the remaining range of the vehicle is limited, and it may be possible to temporarily run the battery at a higher temperature than would otherwise be the case. However, a maximum temperature may be set as a safety limit, and the amount of cooling increased if necessary to prevent the temperature exceeding the safety limit.

It will be appreciated that the battery cooling system shown in FIG. 6 is given by way of example only, and other types of battery cooling system could be used instead or as well. For example, the cooling system could be based on one or more of air cooling, liquid cooling, direct refrigerant cooling, phase change material cooling, thermoelectric cooling, heat pipe cooling or any other type of cooling system. Furthermore, any appropriate parameter or parameters of the battery cooling system may be adjusted in order to reduce power consumption during low SOC. If desired, the battery cooling system could be part of the same cooling system as the traction motor cooling system. If desired, the battery cooling system could include a chiller, and the amount of chilling provided by the chiller could be adjusted to reduce power consumption during low SOC.

The amount of accessories cooling may also be reduced when the battery is at a low SOC in a similar way to the traction motor cooling and the battery cooling described above.

Figure 7:
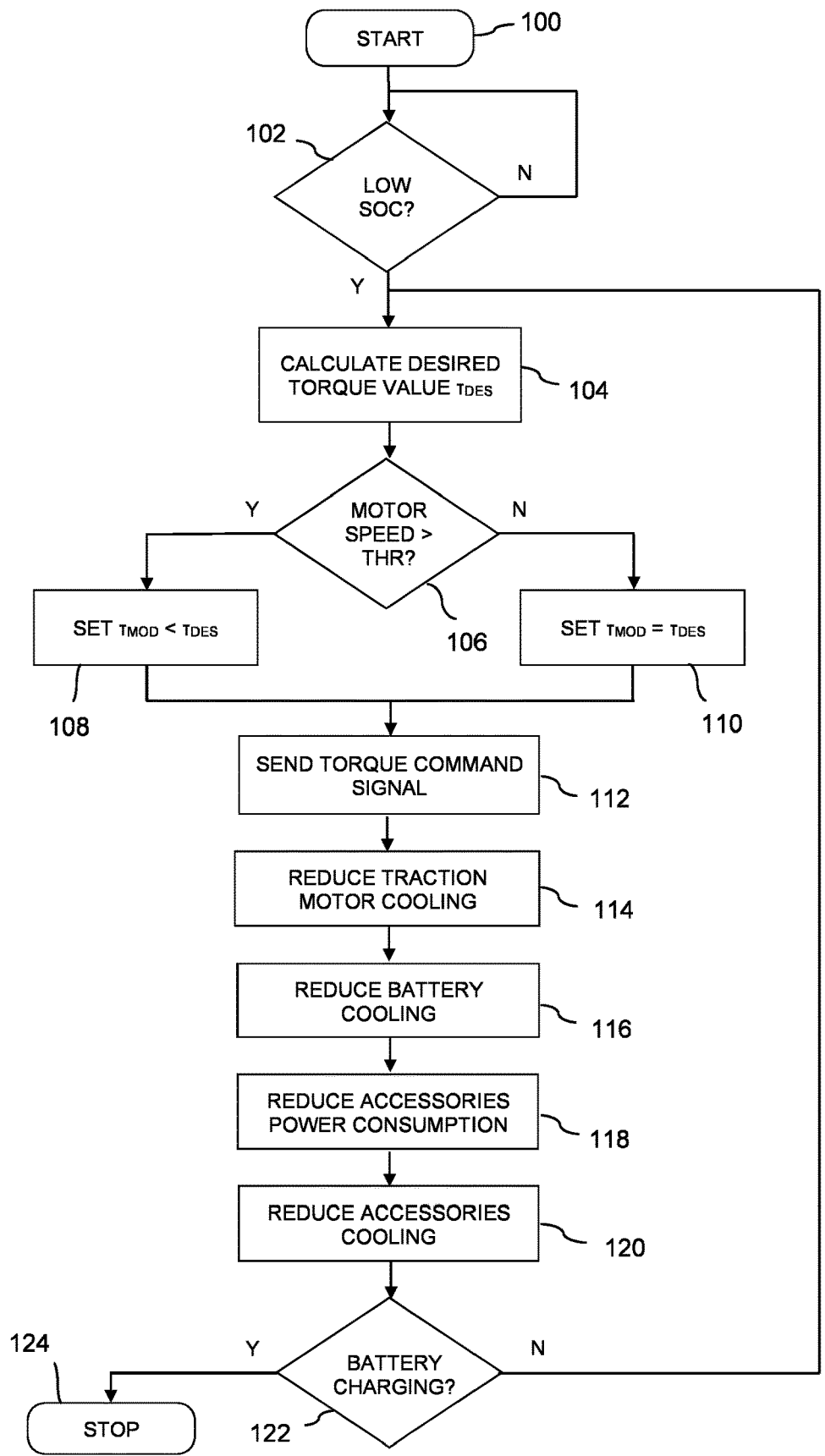
FIG. 7 shows steps carried out by a powertrain control module in an embodiment of the disclosure.

FIG. 7 shows steps carried out by the powertrain control module 30 in one embodiment of the disclosure. Referring to FIG. 7, processing starts in step 100. It is assumed that the system is initially in the normal operating mode. In step 102 it is determined whether the battery is at a low SOC. This is achieved by comparing the SOC signal received from the battery management system with a threshold value. For example, in one embodiment, the battery is determined to be at a low SOC if the SOC signal indicates that the SOC is less than 10% of the battery's nominal capacity. If it is determined that the battery is at low SOC, then the system enters the low SOC mode and processing proceeds to step 104. Otherwise, processing returns to step 102.

In step 104, a desired torque value $\tau DES$ for the traction motor is calculated. The desired torque value $\tau DES$ is the torque value which would meet the driver demand power (as indicated by driver power demand signal) within the system capability. Processing then proceeds to step 106.

In step 106, it is determined whether the traction motor speed is above a predetermined speed threshold. In one exemplary embodiment, the speed threshold is approximately 50% of the maximum speed, although other values could be used instead. If the speed is above the threshold, then processing proceeds to step 108. On the other hand, if the speed is below the threshold, then processing proceeds to step 110.

In step 108, a modified torque value $\tau MOD$ is calculated. In this case, where the motor speed is above the speed threshold, the modified torque value $\tau MOD$ is a value which is less than the desired torque value $\tau DES$. For example, in one embodiment, the modified torque value $\tau MOD$ is set to between 50% and 90% (for example, around 70%) of the desired torque value $\tau DES$, although other values could be used instead. The modified torque value $\tau MOD$ may be based on a modified torque speed curve, which may be stored in memory. If desired, the difference between the modified torque value and the desired torque value could be increased as the motor speed increases above the speed threshold and/or as the desired torque value increases. Processing then proceeds to step 112.

If on the other hand it is determined in step 106 that the traction motor speed is not above the speed threshold, then, in step 110, the modified torque value $\tau MOD$ is set to be equal to the desired torque value $\tau DES$ of the traction motor. Processing then proceeds to step 112.

In step 112, a torque command signal is sent to the traction motor inverter controller. The torque command signal is a signal which instructs the inverter controller to produce a torque equivalent to the modified torque value $\tau MOD$. Thus it will be appreciated that, when the motor speed is below the speed threshold the motor torque is not modified, whereas when the motor speed is above the speed threshold the motor torque is reduced in comparison to normal operation. Processing then proceeds to step 114.

In step 114 the powertrain control module 30 sends a control signal to the traction motor cooling controller 42 instructing it to reduce the amount of motor cooling, in comparison to normal operation. This may be achieved by reducing the speed of a pump and/or fan, such as those shown in FIG. 5, or by adjusting any other appropriate parameter of the motor cooling system. For example, in one embodiment, the pump may be run at between 20% and 80% of its normal speed and the fan may be run at between 0% and 50% of its normal speed, although other values could be used instead. Processing then proceeds to step 116.

In step 116 the powertrain control module 30 sends a control signal to the battery cooling controller 44 instructing it to reduce the amount of battery cooling, in comparison to normal operation. This may be achieved by reducing the speed of a pump and/or fan, such as those shown in FIG. 6, or by adjusting any other appropriate parameter of the battery cooling system. For example, in one embodiment, the pump may be run at between 20% and 80% of its normal speed and the fan may be run at between 0% and 50% of its normal speed, although other values could be used instead. Processing then proceeds to step 118.

In step 118, the powertrain control module 30 sends a control signal to the accessories controller 46 instructing it to reduce the power consumption of the vehicle's accessories, in comparison to normal operation. The electrical accessories may comprise components such as a heater, power steering inverter, compressor, fan, cabin lights, etc. Additionally, the power drawn from the DC/DC converter (and DC/AC converter, if present) is reduced. If a low voltage battery is present, charging of the low voltage battery is also reduced or inhibited. Processing then proceeds to step 120.

In step 120 the powertrain control module 30 sends a control signal to the accessories cooling controller 47 instructing it to reduce the amount of accessories cooling, in comparison to normal operation. This may be achieved by reducing the speed of a pump and/or fan, or by adjusting any other appropriate parameter of the accessories cooling system. If desired, the cooling of different accessories could be reduced by different amounts. Processing then proceeds to step 122.

In step 122 it is determined whether the battery is charging. If the battery is not charging, then processing returns to step 104. If on the other hand the battery is charging, then processing stops in step 124.

Thus, it will be appreciated that, in the low SOC mode, traction motor torque is limited, cooling of the traction motor, inverter, battery and accessories is reduced, and power consumption of the electrical accessories is reduced, in order to reduce power consumption and extend the range of the vehicle.

If desired, in the low SOC mode, the traction motor torque, traction motor cooling, battery cooling and/or accessories power consumption may be varied in dependence on one or more parameters of the powertrain system.

For example, the amount by which the traction motor torque, traction motor cooling, battery cooling, accessories cooling and/or accessories power consumption is reduced may be varied in dependence on the value of the SOC. In this case, the amount by which the traction motor torque, traction motor cooling, battery cooling, accessories cooling and/or accessories power consumption is reduced may increase as the SOC decreases below the low SOC threshold and/or as the SOC approaches zero.

In another example, the traction motor cooling, battery cooling and/or accessories cooling may be varied in dependence on the speed and/or torque of the traction motor. When the motor speed and/or motor torque are low, less heat will be generated in the traction motor and the battery. Thus, the amount of traction motor cooling and/or battery cooling may be reduced when the speed and/or torque of the traction motor (or a time integral thereof) is low.

Furthermore, in calculating the traction motor torque, traction motor cooling, battery cooling, accessories cooling and/or accessories power consumption, parameters such as traction motor speed, traction motor temperature, battery temperature, ambient temperature, ambient pressure, geographic location etc. may be taken into account as well or instead.

Exemplary features of the disclosure have been described above with reference to various embodiments. However, it will be appreciated that the disclosure is not limited to these embodiments, and variations in detail may be made within the scope of the appended claims.

The invention claimed is:

1. A control system for controlling a powertrain of an electric vehicle, the powertrain comprising a traction motor and a battery for powering the traction motor, wherein the control system is configured to:
   detect a low state of charge of the battery; and
   operate the powertrain in a low state of charge mode when the low state of charge is detected,
   wherein, in the low state of charge mode;
      the control system adjusts at least one parameter of the powertrain to reduce power drawn from the battery; and
      the control system is configured to determine when a speed of the traction motor exceeds a threshold, and to reduce a torque of the traction motor to a fixed limit when the speed exceeds the threshold in the low state of charge mode.

2. The control system of claim 1, wherein the parameter comprises at least one of traction motor torque, powertrain cooling, accessory cooling and accessory power consumption.

3. The control system of claim 1, wherein the control system is configured to operate the powertrain system in a normal operating mode when the low state of charge is not detected.

4. The control system of claim 1, wherein the powertrain system comprises an inverter for supplying power to the traction motor, and the control system is configured to control the inverter to reduce a torque of the traction motor in the low state of charge mode.

5. The control system of claim 1, wherein the control system is configured to produce a desired torque signal indicating a desired torque of the traction motor based on an accelerator pedal position signal, and to reduce a torque of the traction motor in comparison to the desired torque in the low state of charge mode.

6. The control system of claim 1, wherein the control system is configured to stop charging a low voltage battery using a high voltage battery and a DC-to-DC converter in the low state of charge mode.

7. The control system of claim 1, wherein the amount by which the torque of the fraction motor is reduced is increased with increase in speed of the traction motor.

8. The control system of claim 1, wherein the powertrain comprises a traction motor cooling system, and the control system is arranged to reduce an amount of cooling provided by the traction motor cooling system in the low state of charge mode.

9. The control system of claim 8, wherein the traction motor cooling system comprises at least one of a pump and a fan, and the control system is configured to reduce a speed of at least one of the pump and the fan in the low state of charge mode.

10. The control system of claim 1, wherein the powertrain comprises a battery cooling system, and the control system is arranged to reduce an amount of cooling provided by the battery cooling system in the low state of charge mode.

11. The control system of claim 10, wherein the battery cooling system comprises at least one of a chiller, pump and a fan, and the control system is configured to reduce a speed of at least one of the pump and the fan and/or reduce or turn off the chilling of the chiller in the low state of charge mode.

12. The control system of claim 11, wherein the powertrain comprises a battery heating system, and the control system is arranged to reduce an amount of heating provided by the battery heating system in the low state of charge mode.

13. The control system of claim 1, wherein the control system is configured to reduce traction motor torque and at least one of traction motor cooling and battery cooling in the low state of charge mode.

14. The control system of claim 1, wherein the powertrain comprises at least one electrical accessory and the control system is configured to reduce a power consumption of at least one electrical accessory in the low state of charge mode.

15. The control system of claim 1, wherein the powertrain comprises at least one of a DC-to-DC converter and a DC-to-AC converter, and the control system is configured to reduce a power drawn from at least one of the DC-to-DC converter and DC-to-AC converter in the low state of charge mode.

16. The control system of claim 1, wherein the powertrain comprises an accessory cooling system, and the control system is arranged to reduce an amount of cooling provided by the accessory cooling system in the low state of charge mode.

17. The control system of claim 1, wherein the battery comprises a battery management system configured to monitor a state of charge of the battery, and the control system is configured to receive a state of charge signal from the battery management system and to determine whether the state of charge signal is below a threshold.

18. The control system of claim 1, wherein the control system is configured to reduce at least one of traction motor torque, traction motor cooling, battery cooling and accessories power consumption in the low state of charge mode, and the amount of reduction is increased as the state of charge decreases.

19. A powertrain for an electric vehicle, the powertrain comprising a traction motor, a battery configured to power the traction motor, and a control system, wherein the control system is configured to:
detect a low state of charge of the battery;
operate the powertrain in a low state of charge mode when the low state of charge is detected; and
determine when a speed of the traction motor exceeds a threshold;
wherein the control system reduces a torque of the traction motor to a fixed limit when the speed exceeds the threshold when the low state of charge is detected; and
wherein, in the low state of charge mode, the control system adjusts at least one parameter of the powertrain to reduce power drawn from the battery.

20. A method of operating a powertrain for an electric vehicle, the powertrain comprising a traction motor and a battery for powering the traction motor, the method comprising:
detecting a low state of charge of the battery;
operating the powertrain in a low state of charge mode when the low state of charge is detected;
determining when a speed of the traction motor exceeds a threshold; and
reducing a torque of the traction motor to a fixed limit when the speed exceeds the threshold when the low state of charge is detected,
wherein, in the low state of charge mode, at least one parameter of the powertrain is adjusted to reduce power drawn from the battery.

* * * * *